Dec. 21, 1954  C. L. CLAWSON  2,697,279
DENTAL ARTICULATOR

Filed Jan. 21, 1953

INVENTOR
CLAUDE L. CLAWSON
BY
ATTORNEY

Dec. 21, 1954 C. L. CLAWSON 2,697,279
DENTAL ARTICULATOR
Filed Jan. 21, 1953 2 Sheets-Sheet 2

INVENTOR
CLAUDE L. CLAWSON
BY Marcus Lothrop
ATTORNEY

United States Patent Office 2,697,279
Patented Dec. 21, 1954

2,697,279

DENTAL ARTICULATOR

Claude L. Clawson, El Cerrito, Calif.

Application January 21, 1953, Serial No. 332,309

4 Claims. (Cl. 32—32)

My invention relates to means useful in the practice of dentistry and particularly in detail prosthesis for the study and adjustment of dental casts.

It is customary in connection with dental casts to have separable frames for holding the casts in occluded position and for permitting them to be readily separated for work and study. It is the general aim of such work and study to provide an improved inter-relationship of the upper dental cast and the lower dental cast for various technical purposes.

It is therefore an object of my invention to provide a better articulator which is an improvement in the field and affords a better than usual mounting for upper and lower dental casts.

Another object of my invention is to provide a dental articulator which will hold the dental casts in open position and in closed position.

A further object of my invention is to provide a dental articulator which can be assembled or separated with great facility.

A still further object of my invention is to provide a dental articulator that is very easily assembled in the laboratory.

Another object of the invention is to provide a dental articulator having many parts formed as a standard framework with the particular dental casts applied thereto for individual use with a simple securing mechanism.

Another object of the invention is to provide a relatively inexpensive and standardized form of dental articulator.

Other objects, together with the foregoing are attained in the embodiments of the invention shown in the accompanying drawings and described in the accompanying description. In the drawings Figure 1 is a side elevation of a dental articulator constructed in accordance with my invention and shown in closed position.

Figure 3:
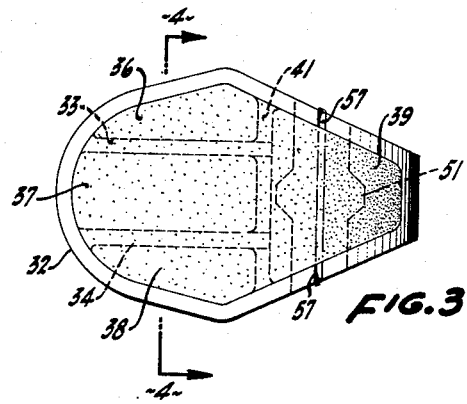
Figure 3 is a plan of the dental articulator shown in Figure 1.
Figure 4:
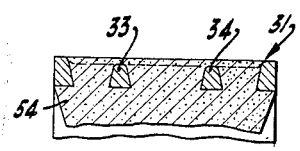
Figure 4 is a cross section, the plane of which is indicated by the line 4—4 of Figure 3, portions of the figure being omitted to reduce its size.
Figure 4:
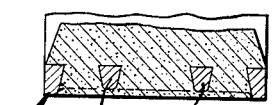
Figure 2:
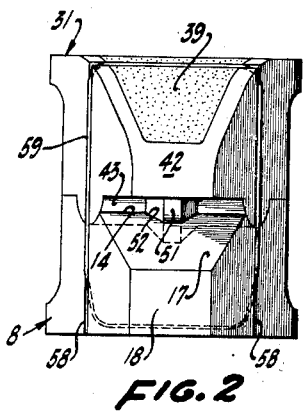
Figure 2 is a rear elevation of the dental articulator of Figure 1.
Figure 1:
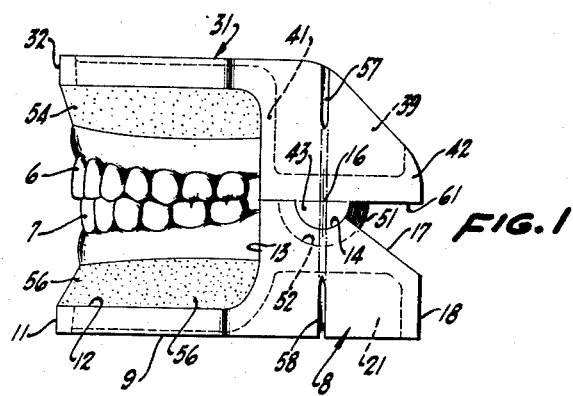
Figure 6:
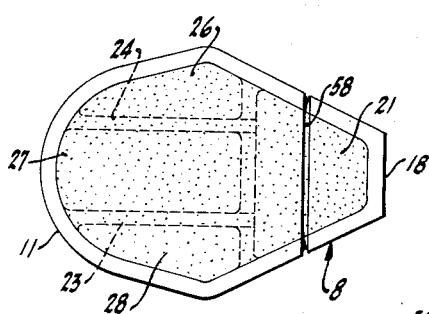
Figure 6 is a bottom plan of my dental articulator.
Figure 5:
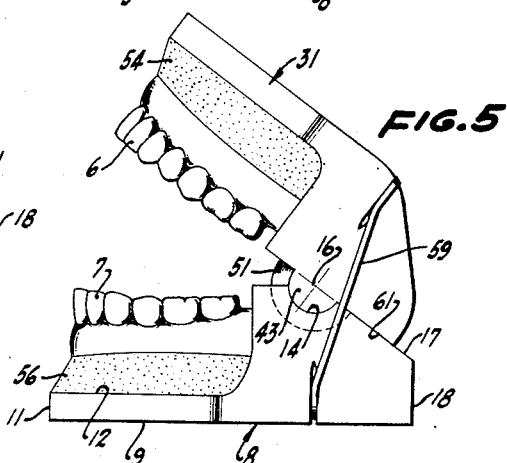
Figure 5 is a side elevation of my dental articulator shown in open position.

The dental articulator of my invention, as shown in Figures 1 to 6, is especially for use in connection with an upper dental cast 6 and a lower dental cast 7 which, when occluded, have a normal bite, as shown in Figure 1, and in most instances constitute reproductions of actual dental equipment. It is desired that the upper cast 6 and the lower cast 7 be related in the occluded position and also be movable into an open position as shown in Figure 5, the movement being in a path which approximately reproduces or simulates nature.

To that end I provide an open work lower frame 8 which is preferably cast or formed of any suitable material such as any of the relatively hard, permanently formed plastics or can even be made of plaster of Paris. The frame 8 is provided with a generally planar, normally horizontal base portion 9 adapted to rest on any suitable support and has a margin 11 or outline in plan of substantially the same size and shape as that of a normal lower cast 7. The frame 8 is cut away at its lower forward portion to provide a platform 12 which is substantially planar and which merges with an upright wall 13 extending transversely of the lower frame. The frame continues to a transversely cylindrical bearing surface 14 generally circular or partially circular in cross-section about a transverse axis 16.

The frame includes a back wall 17 disposed at an inclination but approximately intersecting the axis 16 and terminates in an approximately vertical rear wall 18. The various walls are of substantially uniform thickness, something less than the major dimensions of the frame, to leave a lower hollow 21 in the lower frame. The frame is referred to as an open work frame because the margin 11 thereof is connected to the other walls by intervening struts 23 and 24 spaced above the base 9 and the margin 11 and left by upwardly extending, or upright, through openings 26, 27 and 28 to afford lightness in the frame and for other purposes. The openings 26, 27 and 28 in the lower frame are narrower at the top than at the bottom so that the struts themselves are upwardly enlarged.

Somewhat similarly, there is provided an upper, open work frame 31 having a contour 32 or margin in plan approximately the same as the upper dental cast 6 and having appropriate struts 33 and 34 spaced below the upper plane of the margin 32 and intervening between open spaces 36, 37 and 38. The upper struts are defined by the upright openings which are larger at the top than at the bottom so that the struts themselves are enlarged toward the bottom. The upper frame has an upper cavity 39 to the rear of a low dividing wall 41 and ends in a terminal lip 42. In addition, the upper frame has a transverse cylindrical projection 43 which mates with or interengages with the bearing surface 14 to form a rotatable journal or joint. By the provision of the two members 14 and 43, the upper frame can be rotated with respect to the lower frame about the axis 16 as a center between a closed position, as shown in Figure 1, and an open position, as shown in Figure 5.

In order to maintain the lateral inter-relationship of the upper cast 6 and the lower cast 7 and to preclude transverse shifting of the two frames, the cylindrical members 14 and 43 are provided intermediate thereof and concentric with the axis 16 with means for preventing endwise movement. This means takes the form of a projecting flange 51 on the upper frame interfitting with a corresponding groove 52 in the lower frame. Since the groove and flange are also surfaces of revolution, they do not interfere with the opening and closing movement of the frames but merely preclude endwise shifting. Furthermore, since these surfaces are something less than a half circle or certainly are no greater than a half circle, the upper frame can be detached from the lower frame at any time.

To retain the upper cast 6 in position, the openings between the various struts and in fact all of the internal volume of the upper frame is filled with an integral body of cementitious and somewhat adhesive material. Preferably, this is for example, cement or plaster, finished or struck off on a level with the outside or margin of the frame inasmuch as the struts are slightly below that top surface, as shown in Figure 1. The cementitious material 54 adheres to the upper cast 6 and interlocks with the struts and similarly tapered frame margins of the upper frame. It is easily struck off to approximate the side elevational shape of the upper frame as shown in Figure 1, the frame margins or outline serving as a guide or form for this purpose. There remains, when the work is finished, an upper frame and an upper cast firmly united and having approximately the normal appearance of the usual articulation but one which is stronger and has been made with much less than the usual work because of the original structural stability and framing capacity of the upper frame. Similarly, the lower cast 7 is secured on the lower frame by an integral body of cementitious material 56 similarly struck off on the plane of the frame margin to form a base and on the outline of the other parts of the frame so that the cast and frame are permanently secured together.

As an additional feature, the upper frame is preferably provided with a pair of notches 57 and the lower frame is provided with a similar pair of notches 58 which, in the closed position of the frames, are alined with or are slightly to one side of the axis 16. A suitable spring device, such as a rubber band 59, is placed in the several notches and extends around the two frames so that the tendency of the band when near the axis 16 is to hold the frames in closed position. However, when the frames are forcibly opened, as shown in Figure 5, the rubber band shifts its position away from or across the axis 16 and then is effective to hold the device in open position with the flat lower surface 61 of the upper frame in abutment with the slanting surface 17 of the lower frame.

Figure 8:
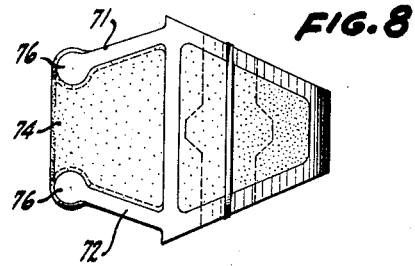
Figure 8 is a plan of the structure shown in Figure 7.
Figure 9:
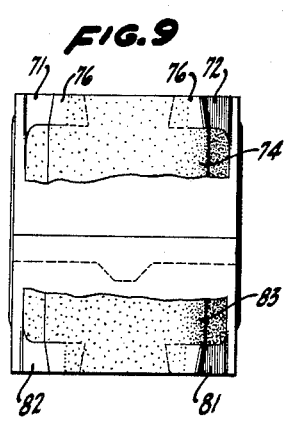
Figure 9 is a front elevation of the structure shown in Figure 7.
Figure 7:
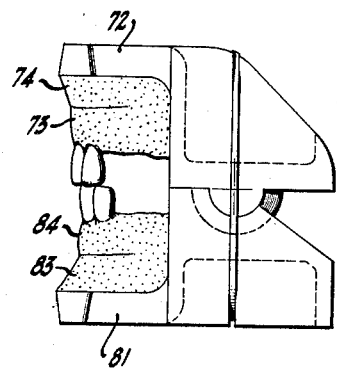
Figure 7 is a side elevation of a modified form of articulator for use with a partial dental cast.

In some instances, it is desired to work with something less than a complete upper cast or a complete lower cast. In that case the structure is modified as shown in Figures 7, 8 and 9 largely to reduce its size and to provide merely a pair of frame projections 71 and 72 or struts serving as suitable outlines, guides and anchors for a partial upper cast 73. This is held in position by a cementitious material 74 interengaging with the frame extensions 71 and 72. For this purpose the extensions are enlarged at the ends to afford bosses 76 and are preferably wider at the bottom than at the top, or are upwardly tapered, so that they assist in holding the cementitious material in position. Quite comparably a lower frame is provided with extensions 81 and 82 of a similar character and having cementitious material 83 to hold the lower partial cast 84 in appropriate location.

Figure 11:
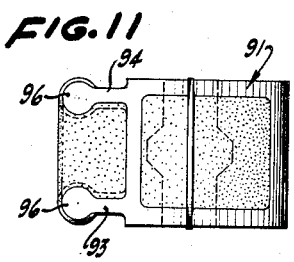
Figure 11 is a plan of the articulator shown in Figure 10.
Figure 12:
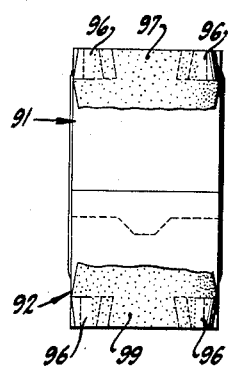
Figure 12 is a front elevation of the form of articulator shown in Figures 10 and 11.
Figure 10:
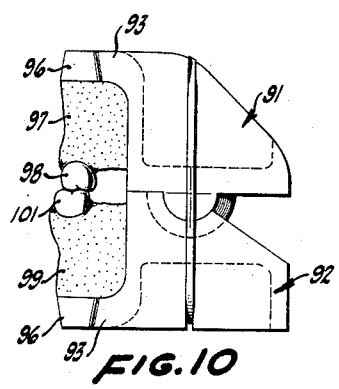
Figure 10 is a side elevation of a further modified form of dental articulator for use with a partial dental cast.

In the event something even more compact than previously described is preferred, a very small upper frame 91 is articulated with a small lower frame 92, as shown in Figures 10, 11 and 12. These relatively small frames are provided with strut extensions 93 and 94 having bosses 96 at the forward ends thereof. Being of a similar, tapered construction they receive a body of cementitious material 97 for holding an upper cast 98 in position and a body of cementitious material 99 for holding a lower cast 101 in position.

In all of the forms of the invention there is provided an open work frame serving as a structural support and an outline guide for the reception of a filling of cementitious material holding a dental cast in place. A pair of the frames, that is, an upper frame and a lower frame, are articulated about a transverse axis by appropriate cylindrical rubbing surfaces and are preferably held either in open position or in closed position by a spring such as a rubber band. The work of the dental technician is greatly facilitated by the provision of the already manufactured frame works so that all he has to do in making appropriate articulations is to cement the various casts in proper relationship, being guided by the outlines of the frame works. There results a strong product reinforced by the frame work and one that is easily, quickly and uniformly fabricated.

What is claimed is:

1. A dental articulator comprising an open work upper frame, an openwork lower frame, means for interrelating said frames for relative rotation about a transverse axis between an open position and a closed position, an upper dental cast, means interengaging said upper frame and engaging said upper dental cast for holding said upper dental cast in position on said upper frame, a lower dental cast, means interengaging said lower frame and engaging said lower dental cast for holding said lower dental cast in position on said lower frame, and spring means engaging said upper and lower frames and passing over said axis for retaining said frames in said open position and said closed position.

2. A dental articulator comprising a cast open work lower frame formed integrally to provide a flat base having between its ends a first transversely extending bearing surface of partial revolution terminating on one side in a first plane parallel to said flat base, a first substantially planar portion on said lower frame on one side of said bearing surface to receive a lower dental cast, a substantially planar back wall extending downwardly from the other side of said bearing surface to serve as a stop, a cast open work upper frame formed integrally to provide a second transversely extending bearing surface of partial revolution fitting said first surface, said bearing surface terminating in a second plane, a second substantially planar portion on said upper frame on one side of said bearing surface overlying said first planar portion and parallel to said second plane, and means on said upper frame providing a flat surface abutting said downwardly extending planar back wall.

3. A dental articulator comprising a cast open work lower frame formed integrally to provide a flat base having between its ends an approximately semi-cylindrical concave bearing surface extending transversely across said lower frame and opening upwardly and terminating on one side in a plane parallel to said flat base and on the other side in a plane inclined downwardly toward said flat base, and a substantially planar portion integrally formed on said lower frame extending approximately parallel to said flat base.

4. A dental articulator comprising a cast open work upper frame formed integrally to provide a flat top having between its ends an approximately semi-cylindrical convex bearing surface extending transversely across said upper frame and depending downwardly and terminating on both sides in a plane parallel to said flat top, and a substantially planar portion integrally formed on said upper frame extending approximately parallel to said flat top.

References Cited in the file of this patent
UNITED STATES PATENTS

| Number | Name | Date |
| --- | --- | --- |
| 400,713 | Slack et al. | Apr. 2, 1889 |
| 1,812,381 | Streker | June 30, 1931 |
| 2,418,824 | D'Essen | Apr. 15, 1947 |